United States Patent
Kim et al.

(10) Patent No.: US 10,484,962 B2
(45) Date of Patent: Nov. 19, 2019

(54) METHOD AND APPARATUS FOR RECEIVING SYSTEM INFORMATION AND PAGING IN MOBILE COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Jaehyuk Jang, Gyeonggi-do (KR); Kyeongin Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 41 days.

(21) Appl. No.: 14/909,654

(22) PCT Filed: Jul. 24, 2014

(86) PCT No.: PCT/KR2014/006740
§ 371 (c)(1),
(2) Date: Feb. 2, 2016

(87) PCT Pub. No.: WO2015/016530
PCT Pub. Date: Feb. 5, 2015

(65) Prior Publication Data
US 2016/0192323 A1   Jun. 30, 2016

(30) Foreign Application Priority Data

Aug. 2, 2013   (KR) .................. 10-2013-0092146

(51) Int. Cl.
*H04W 68/02*   (2009.01)
*H04W 48/12*   (2009.01)
(Continued)

(52) U.S. Cl.
CPC ........... *H04W 68/02* (2013.01); *H04W 48/12* (2013.01); *H04W 52/0206* (2013.01);
(Continued)

(58) Field of Classification Search
CPC . H04W 76/048; H04W 72/082; H04W 88/02; H04W 52/0251; H04W 72/12;
(Continued)

(56) References Cited

U.S. PATENT DOCUMENTS

2008/0186892 A1* 8/2008 Damnjanovic ... H04W 52/0216
                                                                            370/311
2008/0232310 A1*  9/2008 Xu ...................... H04W 76/048
                                                                            370/329

(Continued)

FOREIGN PATENT DOCUMENTS

CN           102057734         5/2011
CN           102917444         2/2013
(Continued)

OTHER PUBLICATIONS

Samsung, "UE Power Consumption gain for the extended DRX", R2-131793, 3GPP TSG RAN WG2 #82, May 20-24, 2013, 6 pages.
(Continued)

*Primary Examiner* — Nimesh Patel
(74) *Attorney, Agent, or Firm* — The Farrell Law Firm, P.C.

(57) ABSTRACT

A method for transmitting/receiving a signal by a base station of a mobile communication system according to an embodiment of the present specification comprises the steps of: receiving, from a terminal, measurement information on neighboring base stations to the terminal; determining a higher signal transmission mode on the basis of the received measurement information; transmitting a request message to a small cell base station which has been determined on the basis of the determined mode and the measurement information; and receiving, from the small cell base station, an identifier for downlink reception and/or a cell identifier of the small cell, the identifiers being transmitted by the small cell. Embodiments of the present specification may provide (Continued)

an apparatus by which a terminal having high mobility can easily receive a signal from a base station and a method of controlling the same.

4 Claims, 17 Drawing Sheets

(51) Int. Cl.
*H04W 52/02* (2009.01)
*H04W 76/28* (2018.01)
(52) U.S. Cl.
CPC .... *H04W 52/0216* (2013.01); *H04W 52/0245* (2013.01); *H04W 76/28* (2018.02); *Y02D 70/00* (2018.01); *Y02D 70/1262* (2018.01); *Y02D 70/21* (2018.01); *Y02D 70/24* (2018.01)
(58) Field of Classification Search
CPC ........... H04W 52/0209; H04W 72/042; H04W 72/04; H04W 36/30; H04W 36/0088; H04W 36/0061; H04W 28/0289; H04W 52/0216; H04W 68/02; H04W 4/005; H04W 48/16; H04W 88/06; H04W 52/0212; H04W 48/20; H04W 72/1278; H04W 52/0229; H04W 36/0066; H04W 52/02; H04W 24/10; H04W 36/0005; H04W 74/006; H04W 76/025; H04W 36/00; H04W 28/0221; H04W 52/0277; H04W 52/325; H04L 5/0035; H04L 5/0037; H04L 5/00; H04L 5/0053; H04L 43/16

See application file for complete search history.

(56) References Cited

U.S. PATENT DOCUMENTS

| | | | | |
|---|---|---|---|---|
| 2009/0040955 | A1* | 2/2009 | Jung | H04W 52/0216 370/311 |
| 2009/0175186 | A1* | 7/2009 | Du | H04W 76/28 370/252 |
| 2009/0196197 | A1 | 8/2009 | DiGirolamo et al. | |
| 2009/0285141 | A1* | 11/2009 | Cai | H04W 52/0251 370/311 |
| 2010/0184458 | A1* | 7/2010 | Fodor | H04W 52/0216 455/522 |
| 2010/0330992 | A1 | 12/2010 | Bhattacharjee et al. | |
| 2011/0034175 | A1 | 2/2011 | Fong et al. | |
| 2012/0257522 | A1* | 10/2012 | Adachi | H04W 52/0229 370/252 |
| 2012/0257557 | A1* | 10/2012 | Yamazaki | H04W 52/0229 370/311 |
| 2012/0300685 | A1* | 11/2012 | Kim | H04W 68/02 370/311 |
| 2013/0039349 | A1 | 2/2013 | Ebrahimi Tazeh Mahalleh et al. | |
| 2013/0094379 | A1 | 4/2013 | Xu | |
| 2013/0170415 | A1* | 7/2013 | Fukuta | H04W 52/0216 370/311 |
| 2013/0301501 | A1* | 11/2013 | Olvera-Hernandez | H04W 76/048 370/311 |
| 2014/0348020 | A1 | 11/2014 | Tenny et al. | |
| 2017/0006659 | A1* | 1/2017 | Jha | H04W 36/22 |
| 2017/0048842 | A1* | 2/2017 | Han | H04L 65/4076 |
| 2017/0048920 | A1* | 2/2017 | Kim | H04W 76/048 |

FOREIGN PATENT DOCUMENTS

| | | |
|---|---|---|
| KR | 1020120055609 | 5/2012 |
| WO | WO 2012/135514 | 10/2012 |
| WO | WO 2013/109109 | 7/2013 |
| WO | WO 2013/149666 | 10/2013 |

OTHER PUBLICATIONS

Intel Corporation, "Summary of Email Discussion [81bis#16][Joint/MTCe] Initial Qualitative Analysis of the Proposed Solutions for UEPCOP", R2-132041, 3GPP TSG RAN WG2 Meeting #82, May 20-24, 2013, 23 pages.
Huawei (Rapporteur), Summary of Email Discussion [82#13][Joint/MTCe] Evaluation of Extended DRX Cycles for UEPCOP, R2-132893, 3GPP TSG-RAN WG2 #83, Aug. 19-23, 2013, 23 pages.
European Search Report dated Dec. 8, 2016 issued in counterpart application No. 14832869.3-1854, 14 pages.
Samsung, "On the Extended DRX Approach for UEPCOP", R2-131792, 3GPP TSG RAN WG2 #82, May 20-24, 2013, 4 pages.
LG Electronics Inc., "Issues on Extended Paging Cycle in RRC_IDLE", R2-131890, 3GPP TSG-RAN WG2 #82, May 20-24, 2013, 3 pages.
Catt, "Considerations on UEPCOP", R2-130996, 3GPP TSG RAN WG2 Meeting #81bis, Apr. 15-19, 2013, 4 pages.
JP Notice of Reasons for Refusal dated Jul. 30, 2018 issued in counterpart application No. 2016-531517, 10 pages.
Chinese Office Action dated Sep. 4, 2018 issued in counterpart application No. 201480043590.4, 19 pages.
PCT/ISA/237 Written Opinion issued on PCT/KR2014/006740 (pp. 5).
PCT/ISA/210 Search Report issued on PCT/KR2014/006740 (pp. 5).

* cited by examiner

METHOD AND APPARATUS FOR RECEIVING SYSTEM INFORMATION AND PAGING IN MOBILE COMMUNICATION SYSTEM

PRIORITY

This application is a National Phase Entry of PCT International Application No. PCT/KR2014/006740, which was filed on Jul. 24, 2014, and claims priority to Korean Patent Application No. 10-2013-0092146, which was filed on Aug. 2, 2013, the contents of each of which are incorporated herein by reference.

TECHNICAL FIELD

The present disclosure relates to a method and an apparatus for effectively acquiring system information and paging when a very long Discontinuous Reception (DRX) cycle is applied in a mobile communication system. Also, the present disclosure relates to a method and an apparatus which can more efficiently receive a signal from a base station according to the mobility of a user equipment in a mobile communication system.

BACKGROUND ART

Typically, mobile communication systems have been developed for the purpose of providing communication while ensuring mobility of users. Due to the rapid development of technologies, the mobile communication systems have reached a stage capable of providing high-speed data communication services as well as voice communication services. Recently, the next-generation mobile communication systems have evolved into Human to Machine (H2M) communication and Machine to Machine (M2M) communication, beyond Human to Human (H2H) communication. In order to meet such a requirement, the 3rd Generation Partnership Project (3GPP), which is responsible for the standardization of communication, is working on a standard for machine-type communication. In a 3GPP System Aspects Working Group 1 (SA1) Working Group (WG) standard, which defines services and the characteristics thereof, service requirements for machine-type communication is already being discussed.

FIG. 1 illustrates a communication scenario in machine-type communication. Machine-type communication devices 105 are connected to a wireless operator's network 110. The machine-type communication devices 105 may be typically defined as various unmanned devices such as meters, vending machines, or the like, and have characteristics different in many aspects from those of the existing wireless terminals. Also, the characteristics of the machine-type communication devices 105 may depend on the types thereof. One cell may include numerous machine-type communication devices 105 which have the various characteristics as described above. A machine-type communication server 115, which has information on the machine-type communication devices 105, may serve not only to perform authentication, but also to collect pieces of information acquired from the machine-type communication devices 105 and to deliver the collected pieces of information to a machine-type communication user 120. The machine-type communication server 115 may exist inside or outside the wireless operator's network. The machine-type communication user 120 is an end user that requires information delivered by the machine-type communication devices 105.

The machine-type communication has characteristics different from those of the existing wireless communication. Also, the characteristics of the machine-type communication may be very variously classified according to use purposes thereof. For example, machine-type communication devices, which require communication only a few times a day regardless of time, have a time-tolerant characteristic, and machine-type communication devices, which are installed at fixed positions and serve to collect and transmit particular information without mobility, have a low mobility characteristic. Wireless operators need to provide services in view of such various characteristics of the machine-type communication and the coexistence of machine-type communication devices with the existing terminals.

Among the machine-type communication devices, tracking-related devices, such as devices equipped on animals or cargo vehicles, typically use batteries, or are supplied with power generated by themselves. Accordingly, since the machine-type communication devices need to use limited power, and it is desirable that the machine-type communication devices efficiently use extremely small power. The 3GPP SA1 WG defines an extra low power consumption mode, in which machine-type communication devices may be configured to be able to use low power. In this situation, there is a need for a method and an apparatus for transmitting and receiving signals to/from the machine-type communication devices.

DETAILED DESCRIPTION OF THE INVENTION

Technical Problem

According to the above-mentioned demands, an aspect of the present disclosure is to provide a method and an apparatus which can more efficiently receive system information and a paging signal of a network in a user equipment to which a longer reception cycle is applied.

Also, another aspect of the present disclosure is to provide a method and an apparatus which enable multiple base stations to transmit signals to a user equipment so that the user equipment can more efficiently receive a signal from a base station even when the user equipment moves at a high speed within a cell that the base station forms.

Technical Solution

In accordance with an aspect of the present disclosure, a method for transmitting/receiving a signal by a base station of a mobile communication system is provided. The method includes: receiving measurement information on measurement of a neighboring base station by a user equipment from the user equipment; determining a higher signal transmission mode based on the received measurement information; transmitting a request message to a small cell base station determined based on the determined higher signal transmission mode and the measurement information; and receiving, from the small cell base station, at least one of an identifier for downlink reception transmitted by the small cell and a cell identifier of the small cell.

In accordance with another aspect of the present disclosure, a method for transmitting/receiving a signal by a user equipment of a mobile communication system is provided. The method includes: transmitting, to a base station, measurement information on measurement of a neighboring base station by the user equipment; and receiving, from the base station, at least one of an identifier for downlink reception from a small cell base station, which is determined based on the measurement information, and a cell identifier of the small cell.

In accordance with still another aspect of the present disclosure, a method for receiving system information by a user equipment of a mobile communication system is provided. The method includes: receiving information related to a Discontinuous Reception (DRX) cycle from a base station; comparing the DRX cycle with a threshold value; and receiving modified System Information (SI) according to a result of the comparison, wherein the receiving of the modified SI includes receiving the modified SI according to a received paging signal when the DRX cycle is less than the threshold value.

In accordance with yet another aspect of the present disclosure, a method for transmitting system information by a base station of a mobile communication system is provided. The method includes: transmitting information related to a Discontinuous Reception (DRX) cycle to a user equipment; transmitting a paging signal to the user equipment when System Information (SI) is modified; and broadcasting the modified SI to the user equipment, wherein the user equipment compares the DRX cycle with a threshold value, receives the modified SI according to a result of the comparison, and receives the modified SI according to the received paging signal when the DRX cycle is less than the threshold value.

Advantageous Effects

An embodiment of the present disclosure can provide the user equipment, to which a longer reception cycle is applied and which efficiently receives one or more of system information and a paging signal of a base station network and thereby can have higher power efficiency, and the controlling method thereof.

Also, another embodiment of the present disclosure can provide the apparatus which enables a user equipment having high mobility to easily receive a signal from a base station, and the method for controlling the same.

MODE FOR CARRYING OUT THE INVENTION

Figure 1:
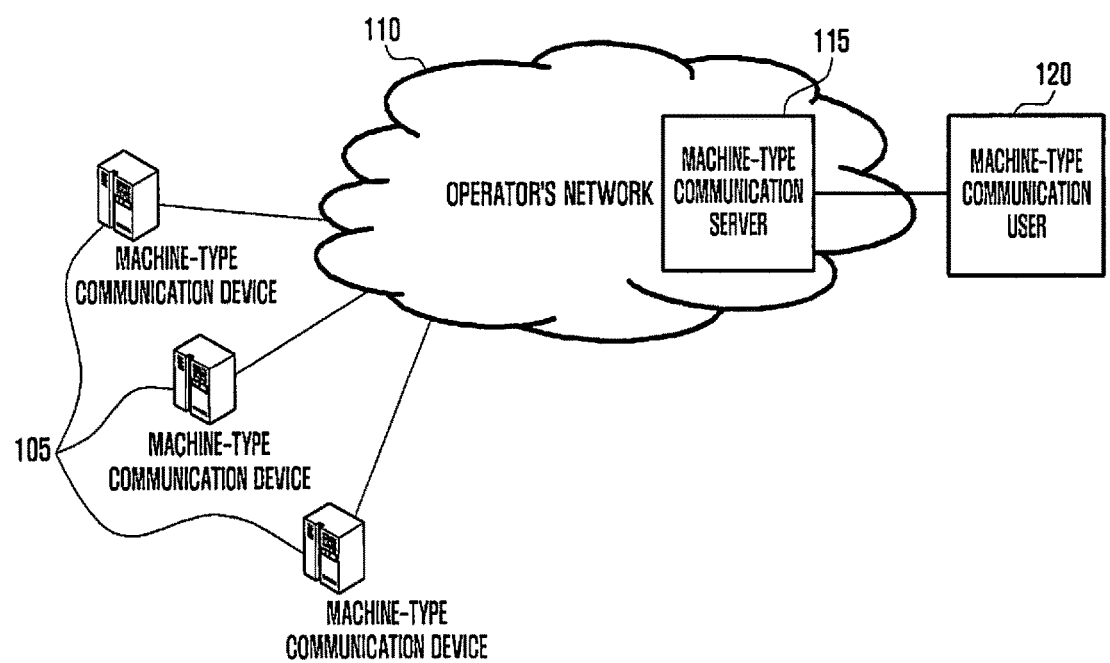
FIG. 1 is a view for explaining a communication scenario in machine-type communication.

Hereinafter, embodiments of the present disclosure will be described in detail with reference to the accompanying drawings.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Embodiments of the present disclosure relate to a method and an apparatus for effectively acquiring SI and paging when a very long DRX cycle is applied in a mobile communication system. More particularly, embodiments of the present disclosure may be applied to an LTE-based mobile communication system.

A user equipment in the form of a machine-type communication device needs to minimize power consumption. The present disclosure proposes a method in which a user equipment effectively acquires SI and paging broadcasted by a base station when a very long DRX cycle is applied in order to improve power consumption.

Also, embodiments of the present disclosure include configurations of the method and the apparatus for effectively acquiring SI and paging when a very long DRX cycle is applied in a mobile communication system. A user equipment in the form of a machine-type communication device needs to minimize power consumption. The present disclosure proposes the method in which the user equipment effectively acquires SI and paging broadcasted by the base station when a very long DRX cycle is applied in order to improve power consumption.

Embodiment 1

One of methods capable of improving a power consumption problem in a user equipment of a mobile communication system is a method for increasing a DRX cycle.

The user equipment may perform a reception operation in order to receive a paging signal from a base station. However, a paging signal is not frequently transmitted, and thus the power loss of the user equipment may increase when the user equipment performs a reception operation even for a time period during which the paging signal is not transmitted.

Accordingly, in order to reduce power consumption of the user equipment, the user equipment may attempt to receive a paging signal by periodically performing an operation of receiving the paging signal only during a particular time period. This configuration is referred to as "DRX." In an LTE system, DRX operations of user equipments, which are in a standby state, may be achieved as defined by Equation 1 below. A System Frame Number (SFN) increases by 1 on a per-radio frame basis. When a paging signal is delivered in a radio frame satisfying Equation 1 below, the user equipment performs a reception operation according to DRX.

$$\text{SFN mod } T = (T \text{ div } N)*(UE\_ID \text{ mod } N) \quad \text{Equation 1}$$

In Equation 1,

SFN: System Frame Number. 10 bits (Most Significant Bit (MSB) 8 bits are explicit, and Least Significant Bit (LSB) 2 bits are implicit.)

T: DRX cycle of the User Equipment (UE). Transmitted on SIB2. ENUMERATED {rf32, rf64, rf128, rf256}

N: min(T,nB)

nB: Transmitted on SIB2. ENUMERATED {4T, 2T, T, T/2, T/4, T/8, T/16, T/32}.

UE_ID: IMSI mod 1024 (International Mobile Station Identity (IMSI) is a unique number assigned to each UE)

Eight bits in a MasterInformationBlock (MIB) of a Physical Broadcast CHannel (PBCH) represent an SFN. T and nB are values provided by a base station in a state of being included in a SystemInformationBlockType2 (SIB2). T may have one value from among {rf32, rf64, rf128, rf256}, and r32 represents the length of a 32 radio frame. Specifically, r32 may signify 320 ms.

Figure 2:
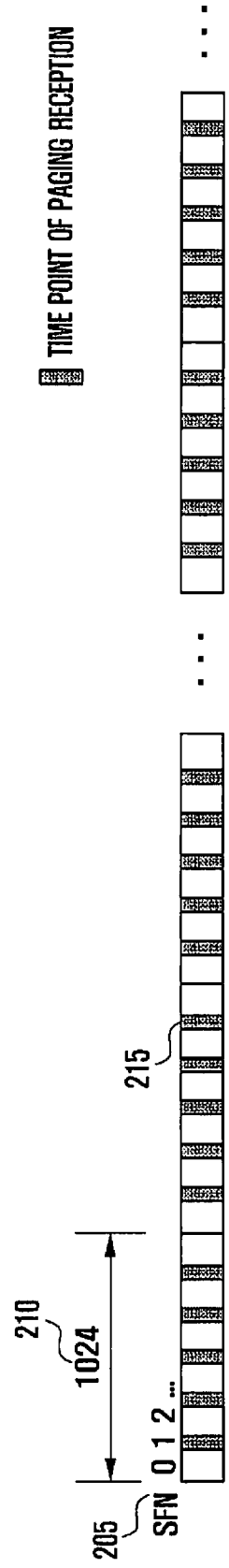
FIG. 2 is a view for conceptually explaining a paging time point in Long Term Evolution (LTE) technology.

FIG. 2 conceptually illustrates a paging time point in LTE technology.

Referring to FIG. 2, an SFN may increase by 1 on a per-radio frame basis as indicated by reference numeral 205. The SFN has a value which is reset to zero in a cycle of 1024 as indicated by reference numeral 210. As defined by Equation 1, paging of an identical pattern is repeated in each SFN cycle as indicated by reference numeral 215. It can be noted from Equation 1 that a maximum DRX cycle in the current LTE standard is equal to 2.56 seconds and may not exceed the cycle (i.e., 10.24 seconds) of the SFN even when the DRX cycle is increased to a maximum.

In other words, in order to reduce power consumption, the DRX cycle needs to be increased by 10.24 seconds or more, and the SFN cycle also needs to be increased. In the present disclosure, in order to increase the SFN cycle, an additional SFN bit may be included in an existing or new System Information Block (SIB), and an operation of the UE for receiving the SIB including the additional SFN bit may be defined.

The SFN bits are characterized as increasing by 1 in each SFN cycle. Also, the SFN bits are characterized in that all UEs do not need to receive an SIB including the SFN bits and only a UE, to which a very long DRX cycle is applied, attempts to receive the SIB including the SFN bits. Further, a systemInfoValueTag value (one Information Element (IE) included in SIB1), which conventionally increases by 1 whenever SIB information is modified, and a systemInfoModification IE, which is included in paging and notifies of whether SI is modified, are not affected by a change in the value of the SFN bits. Specifically, even when the value of the SFN bits is changed, the systemInfoValueTag IE is not updated, and the systemInfoModification IE is not transmitted through paging.

When the DRX cycle is increased together with the above-described extension of the SFN cycle, a case occurs in which a process of identifying whether SI is modified and updating the current SI may not be performed.

Figure 3:
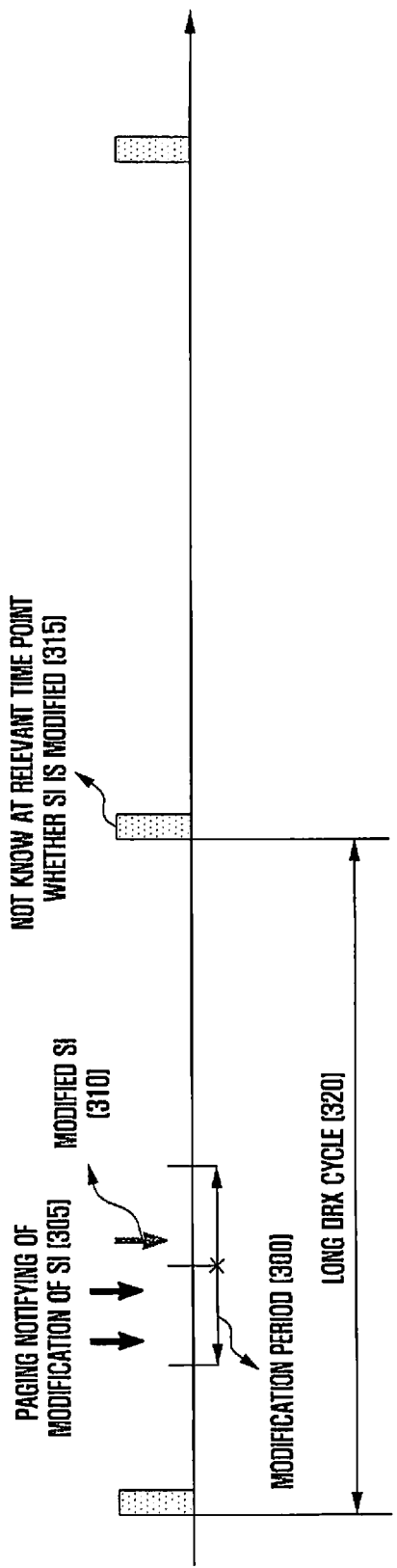
FIG. 3 is a view for explaining a process in which, when a very long DRX cycle is applied, whether System Information (SI) is modified may not be identified and the current SI may not be updated to new SI.

FIG. 3 is a view for explaining a process in which, when a very long DRX cycle is applied, whether SI is modified may not be identified and the current SI may not be updated to new SI.

Referring to FIG. 3, in an embodiment of the present disclosure, the UE may identify a paging signal in a very long DRX cycle 320.

The base station may notify the UE that SI is soon to be modified, by using paging 305 before modification of SI as indicated by reference numeral 310. Such an operation may be performed with a modification period 300 as a reference.

Specifically, during the modification period before the modification of the SI, the base station notifies the UE that the SI is to be modified in the next modification period, by using paging. Accordingly, the UE may receive paging at least once during the modification period, and may identify whether SI is to be modified in the next modification period.

The UE identifies paging in each DRX cycle, and thus may miss the transmitted paging as indicated by reference numeral 315 when the paging is transmitted during the very long DRX cycle 320.

In order to solve the above-described problem, an embodiment of the present disclosure introduces a method for extending a modification period and a method in which the UE wakes up immediately before a DRX timing and identifies cell (re)selection and whether SI is modified, and proposes a method for selectively applying the two methods according to a particular condition in view of advantages and disadvantages of the two methods.

Figure 4:
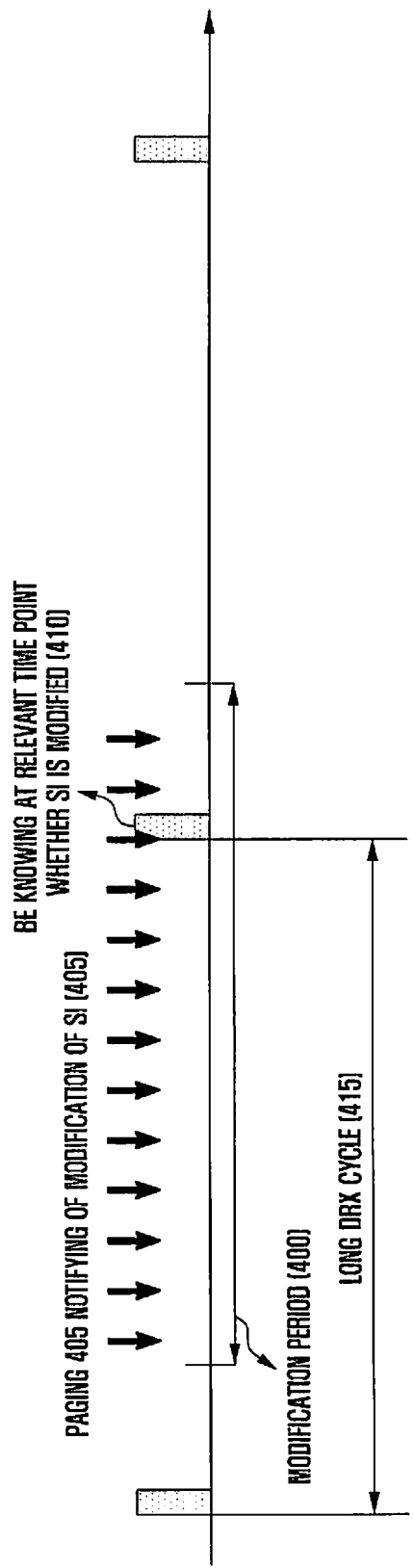
FIG. 4 is a view for explaining a method for extending a modification period so as to enable paging to be received although a very long DRX cycle is applied.

FIG. 4 is a view for explaining a method for extending a modification period so as to enable paging to be received although a very long DRX cycle is applied.

Referring to FIG. 4, a modification period is extended so that at least one DRX timing may be included in one modification period 400. At this time, paging 405 notifying of a change in SI may be transmitted during the extended modification period, and the UE may receive the paging 405 at least once as indicated by reference numeral 410.

The value of the modification period is provided to the UE through SIB2. However, the modification period also needs to be extended as a DRX cycle becomes longer, and thus a disadvantage may occur in that signaling overhead due to the transmission of paging increases during this time period. Moreover, a modification period is identically applied to all of the UEs. Accordingly, although the extended modification period is mainly useful only to Machine-Type Communication (MTC) devices, all of the UEs need to apply the extended modification period. Another disadvantage of the extended modification period is that the UEs may receive the updated SI as late as the extended modification period. Accordingly, in order to solve the above-described problem, a typical UE and an MTC device may apply different modification periods. Specifically, the base station broadcasts two types of modification period values to the UEs through SIB2. First, the UE applies a conventional modification period, and each of the MTC devices applies a newly-defined modification period. Alternatively, the new modification period for the MTC devices may not be explicitly provided to the MTC devices through SIB2, but the MTC devices may implicitly use a pre-agreed fixed value, for example, 10.24 seconds. In this case, additional signaling overhead may be reduced.

Figure 5:
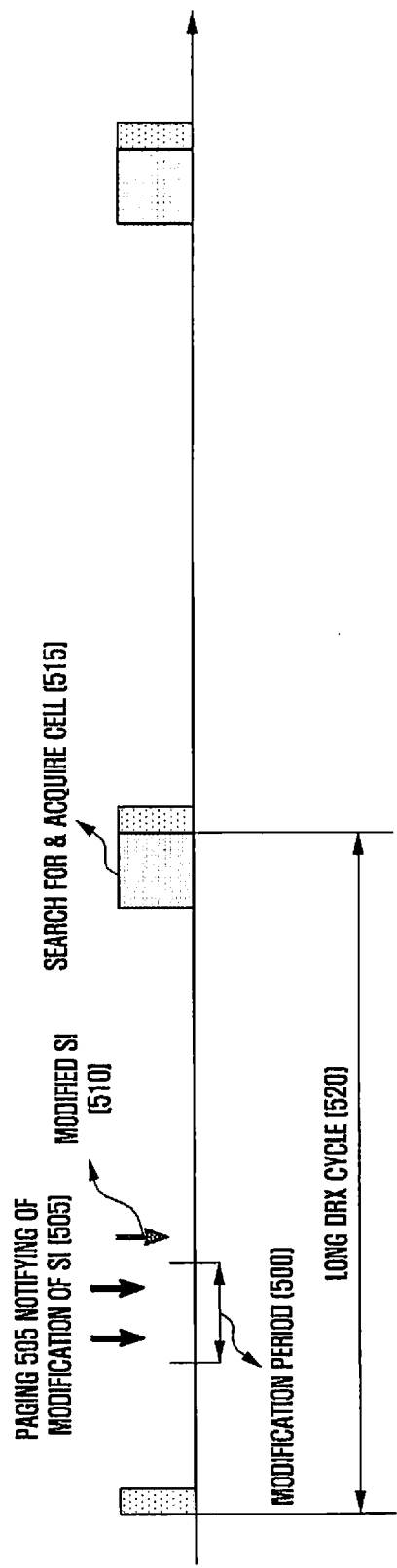
FIG. 5 is a view for explaining a method in which a user equipment wakes up immediately before a DRX timing and identifies cell (re)selection and whether SI is modified.

FIG. 5 is, a view for explaining a method in which a UE wakes up immediately before a DRX timing and confirms cell (re)selection and whether SI is modified.

Referring to FIG. 5, paging 505 notifying of the modification of SI is transmitted during one modification period 500, and the modified SI is transmitted in the next modification period.

The UE has a very long DRX cycle 520, and thus may not identify the paging 505 notifying of the modification of the SI. Instead, the UE may wake up immediately before a DRX timing is generated, and may receive the SI. More specifically, the UE previously wakes up immediately before the DRX timing is generated, performs a cell (re)selection operation, identifies a suitable cell, and receives the SI from the cell. The received SI may include one of a new SIB and an existing SIB, each of which includes the above-described SFN bits, together with a MIB, SIB1, SIB2, and SIB14, as indicated by reference numeral 515. Thereafter, the UE attempts to receive paging at the DRX timing. This operation has an advantage in that the UE surely receives the most recent required SI, but has a disadvantage in that the burden of the UE is increased due to the execution of the above-described operation at each DRX timing when the DRX cycle is not a little long.

Accordingly, an embodiment of the present disclosure proposes a scheme in which the UE selectively uses a method for extending a modification period and a method for allowing the UE to wake up immediately before a DRX timing and to identify cell (re)selection and whether SI is modified, on the basis of whether the applied DRX cycle exceeds a particular threshold value.

Figure 6:
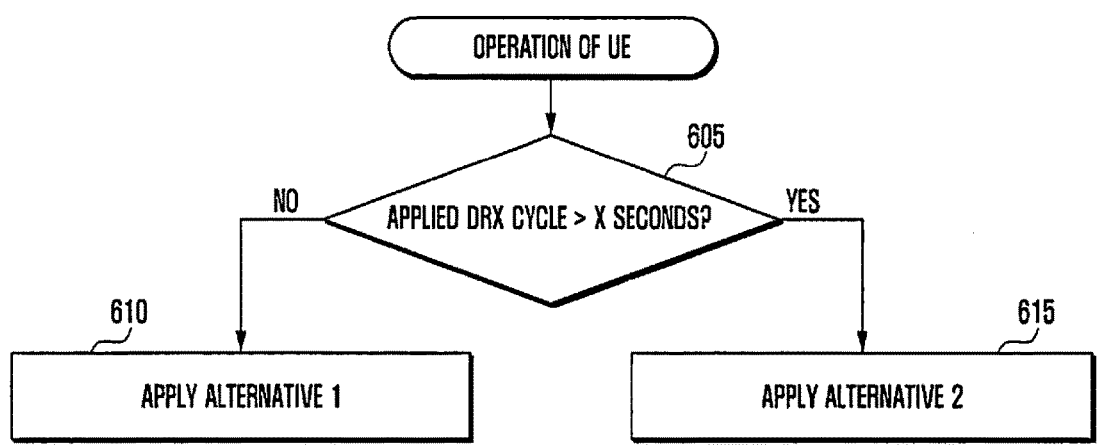
FIG. 6 is a view for explaining a scheme in which, according to a DRX cycle applied in the present disclosure, selective use is made of a method (Alternative 1) for extending a modification period and a method (Alternative 2) for allowing a user equipment to wake up immediately before a DRX timing and to identify cell (re)selection and whether SI is modified.

FIG. 6 is a view for explaining a scheme in which, according to a DRX cycle applied in the present disclosure, selective use is made of a method (Alternative 1) for extending a modification period and a method (Alternative 2) for allowing a UE to wake up immediately before a DRX timing and to confirm cell (re)selection and whether SI is modified.

Referring to FIG. 6, in step 605, the UE may determine whether a currently-applied DRX cycle is greater than a particular threshold value X. The threshold value X may be a predetermined value, or may be explicitly received from the base station. For example, a modification period may be extended to a maximum of 10.24 seconds in the current LTE standard. Accordingly, 10.24 seconds may be determined as the threshold value X. Alternatively, the base station may notify the UE of information on the threshold value X through a SIB or dedicated signaling.

When the applied DRX cycle is less than the threshold value X, in step 610, the UE attempts to receive paging at the DRX timing. When a systemInfoModification IE included in the paging has a value of "true," the value of "true" notifies of the modification of the SI in the next modification period, and the UE receives new SI in the next modification period by using the value of a modification period acquired from SIB2.

When the applied DRX cycle is greater than the threshold value X, in step 620, the UE may wake up immediately before the DRX timing is generated, and may receive the SI. More specifically, the UE may previously wake up immediately before the DRX timing is generated, may perform a cell (re)selection operation, may identify a suitable cell, and may receive the SI from the cell.

Figure 7:
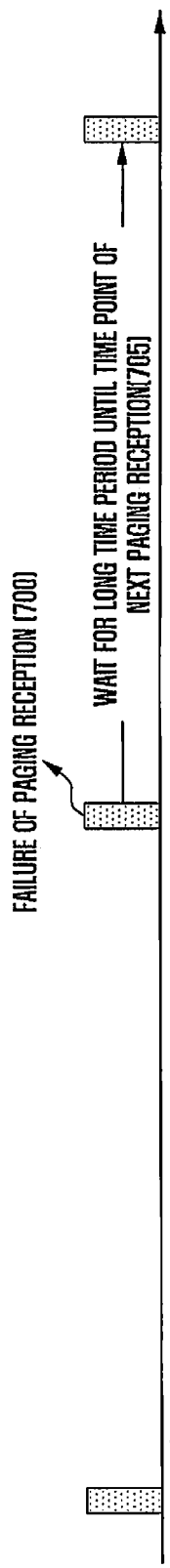
FIG. 7 is a view for explaining a case where paging reception fails at a DRX timing.

FIG. 7 is a view for explaining a case where paging reception fails at a DRX timing.

Referring to FIG. 7, when the UE fails to receive paging at a particular DRX timing as indicated by reference numeral 700, the UE needs to wait for a very long DRX cycle until the UE attempts to receive the next paging, as indicated by reference numeral 705. Accordingly, in order to solve such a delay problem, the present disclosure proposes a method for transmitting multiple pagings at a DRX timing.

Figure 8:
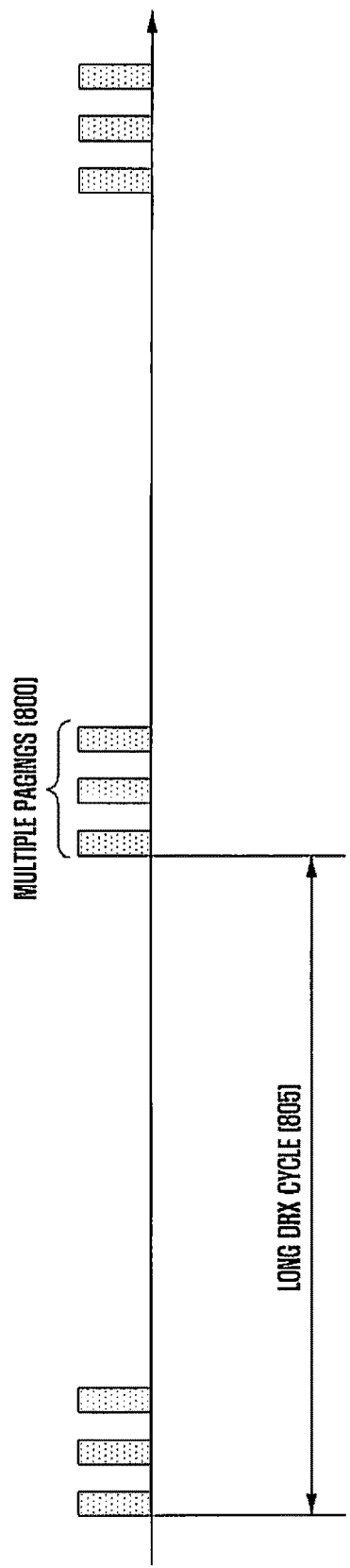
FIG. 8 is a view for explaining a method for solving a delay problem when paging fails.

FIG. 8 is a view for explaining a method for solving a delay problem when paging fails.

Referring to FIG. 8, when a DRX timing comes in the UE to which a very long DRX cycle 805 is applied, paging is not transmitted only once, but multiple pagings 800 are transmitted in a short cycle in such a manner as to correspond to particular number of times. When the UE only receives at least one of the multiple pagings 800, the UE may successfully acquire paging information, and thus can increase the probability of paging reception. For the repeated number of times of paging transmission and a cycle between transmissions, predetermined values may be used, or the base station may notify the UE of the repeated number of times of paging transmission and the cycle between transmissions through a SIB. According to an embodiment of the present disclosure, the multiple pagings 800 may be transmitted even to a UE to which the very long DRX cycle 805 is not applied.

Figure 9:
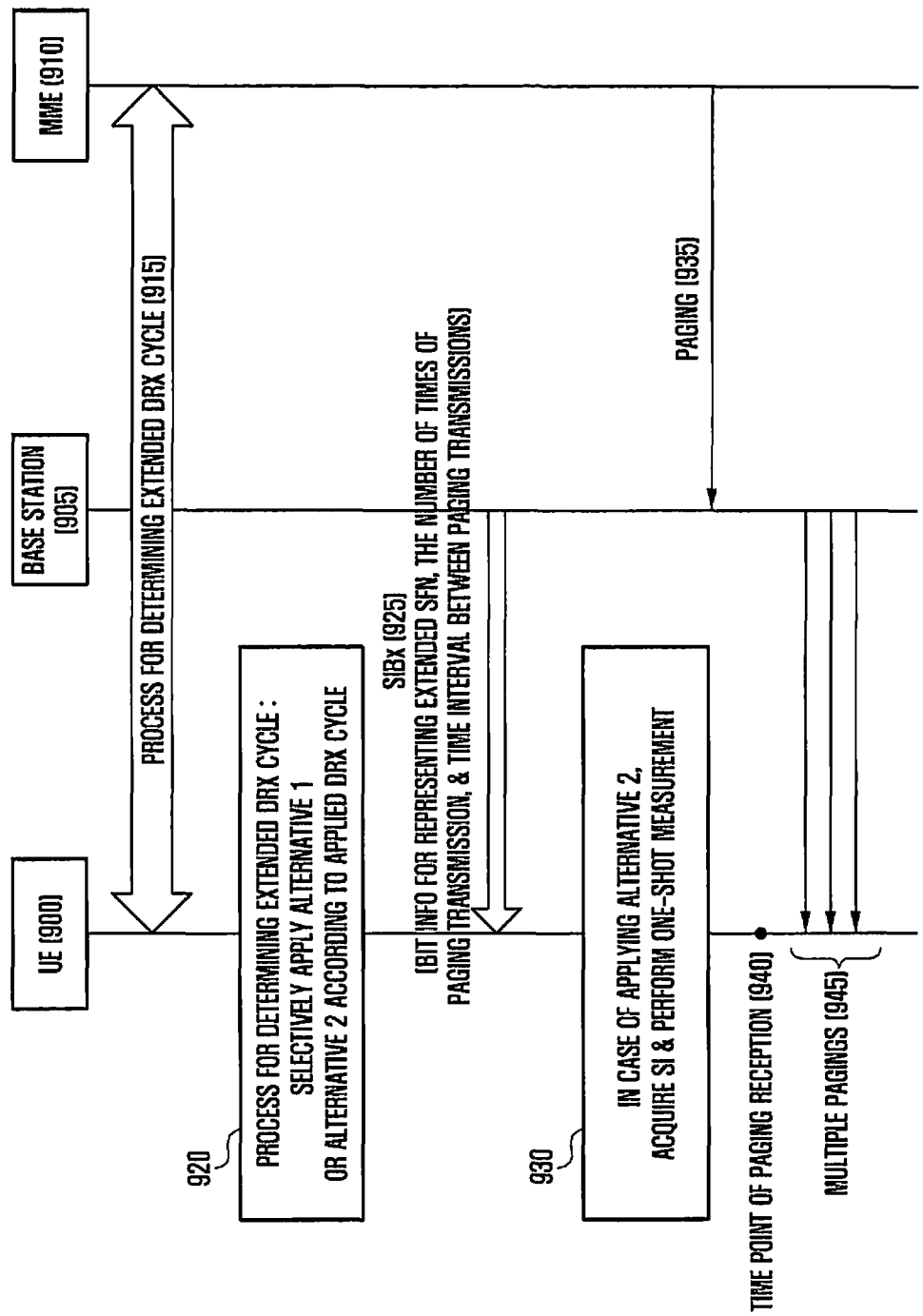
FIG. 9 is a view for explaining a process for receiving paging when a very long DRX cycle is applied in the present disclosure.

FIG. 9 is a view for explaining a process for receiving paging when a very long DRX cycle is applied in the present disclosure.

Referring to FIG. 9, in order to apply a very long DRX cycle, a UE 900, a base station 905, and a Mobility Management Entity (MME) 910 require a setting process 915 thereamong. In the setting process 915, the base station and the MME previously share whether the base station and the MME are capable of supporting a very long DRX cycle. The UE sends a request for a very long DRX cycle to the MME through an Attach or Tracking Area Update (TAU) process. When the MME is capable of supporting the very long DRX cycle, the MME notifies the UE that the MME is capable of supporting the very long DRX cycle, through an Attach Accept message. The UE disregards a cell-specific DRX value broadcasted by the base station, and applies the requested very long DRX cycle. The MME notifies the base station that the UE is applying the very long DRX cycle. When the base station transmits paging, the base station considers the very long DRX cycle. In step 920, the UE 900 may determine whether the currently-applied DRX cycle is greater than a particular threshold value X. According to a result of determining whether the currently-applied DRX cycle is greater than the particular threshold value X, one method may be selected from among the method (Alternative 1) for extending a modification period and the method (Alternative 2) for allowing the UE 900 to wake up immediately before a DRX timing and to identify cell (re)selection and whether SI is modified, and the selected method may be applied.

In order to apply the very long DRX cycle, the UE 900 needs to receive additional SFN bits.

In step 925, the UE 900 acquires the SFN bit information from SIBx broadcasted by the base station 905. Also, SIBx may include the number of times of transmission of paging and cycle information at each DRX timing. When the method (Alternative 2) has been applied for allowing the UE 900 to wake up immediately before a DRX timing and to identify cell (re)selection and whether SI is modified, in step 930, the UE 900 may wake up before the DRX timing, and may attempt to perform a cell (re)selection process and receive the SI. At this time, for the cell (re)selection process, the UE 900 performs cell measurement, and the cell measurement is characterized by the determination of cell (re) selection based on one measurement sample.

In step 935, when paging arrives at the base station 905 from the MME 910, in step 945, the base station 905 transmits multiple pagings to the UE at a time point (a DRX timing) of paging occasion 940. The transmission of the multiple pagings may be performed based on the information which is set in step 925.

Embodiment 2

Embodiment 2 relates to the RRC diversity technique. The RRC diversity refers to a technique which allows a UE to transmit and receive identical RRC messages to/from multiple base stations and increases the probability of successful reception of an RRC message.

The RRC diversity may be classified into DL RRC diversity and UL RRC diversity. In the DL RRC diversity, the UE receives an identical RRC message from the multiple base stations. According to an embodiment of the present disclosure, the DL RRC diversity is effective particularly in a handover process during which a received signal strength is unstable.

In the UL RRC diversity, the UE transmits an identical RRC message to the multiple base stations. Also, in a cell boundary area, the UL RRC diversity may increase the probability of successful transmission of an RRC message.

Figure 10:
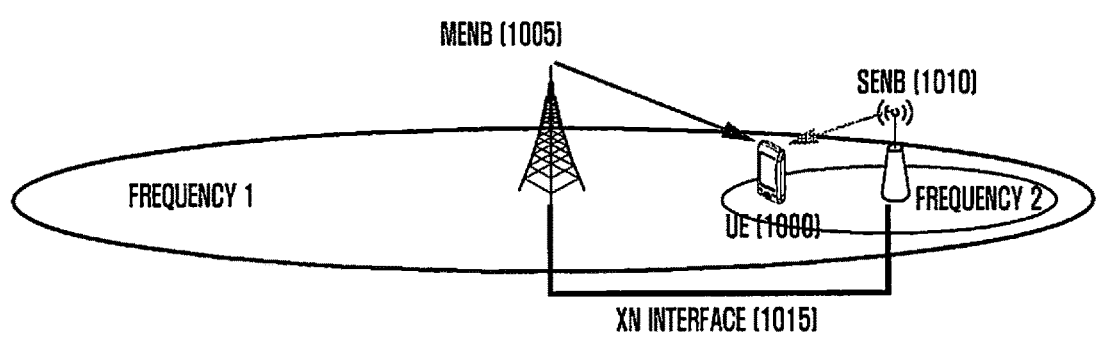
FIG. 10 is a view for conceptually explaining a Radio Resource Control (RRC) diversity technique.

FIG. 10 is a view for conceptually explaining an RRC diversity technique.

Referring to FIG. 10, a UE 1000 may simultaneously receive an RRC message including identical information from two base stations, namely, an MeNB 1005 and an SeNB 1010.

RRC messages, which are intended to be transmitted to the UE 1000, may be exchanged through an Xn backhaul 1015 to which the MeNB 1005 and the SeNB 1010 are connected. The two base stations 1005 and 1010 may use an identical frequency or different frequencies.

When the UE 1000 moves from the MeNB 1005 to the SeNB 1010, typically, the UE 1000 performs a handover process and changes a serving cell from the MeNB 1005 to the SeNB 1010. During the handover process, the SeNB 1010 may provide a better signal strength than the MeNB 1005 according to a situation.

For example, when the UE 1000 moves from the MeNB 1005 to the SeNB 1010 at a fast speed, the strength of a received signal from the MeNB 1005 may be rapidly reduced. In contrast, the strength of a received signal from the SeNB 1010 may become rapidly better. With respect to the handover process, the MeNB 1005, which is a current serving cell, transmits a HandOver (HO) command to the UE 1000 and indicates the execution of a handover. When the strength of a received signal from the MeNB 1005 is not good enough and the UE 1000 cannot receive the HO command, the handover may fail. When the SeNB 1010 also transmits an identical HO command to the UE 1000, the probability of the success of a handover may be improved. Typically, the UE 1000 moves to the SeNB 1010, and thus the strength of a received signal from the SeNB 1010 may be good enough.

Embodiment 2 proposes a specific process for performing RRC diversity. The specific process includes information that the UE 1000, the MeNB 1005, and the SeNB 1010 need to mutually exchange.

Figure 11:
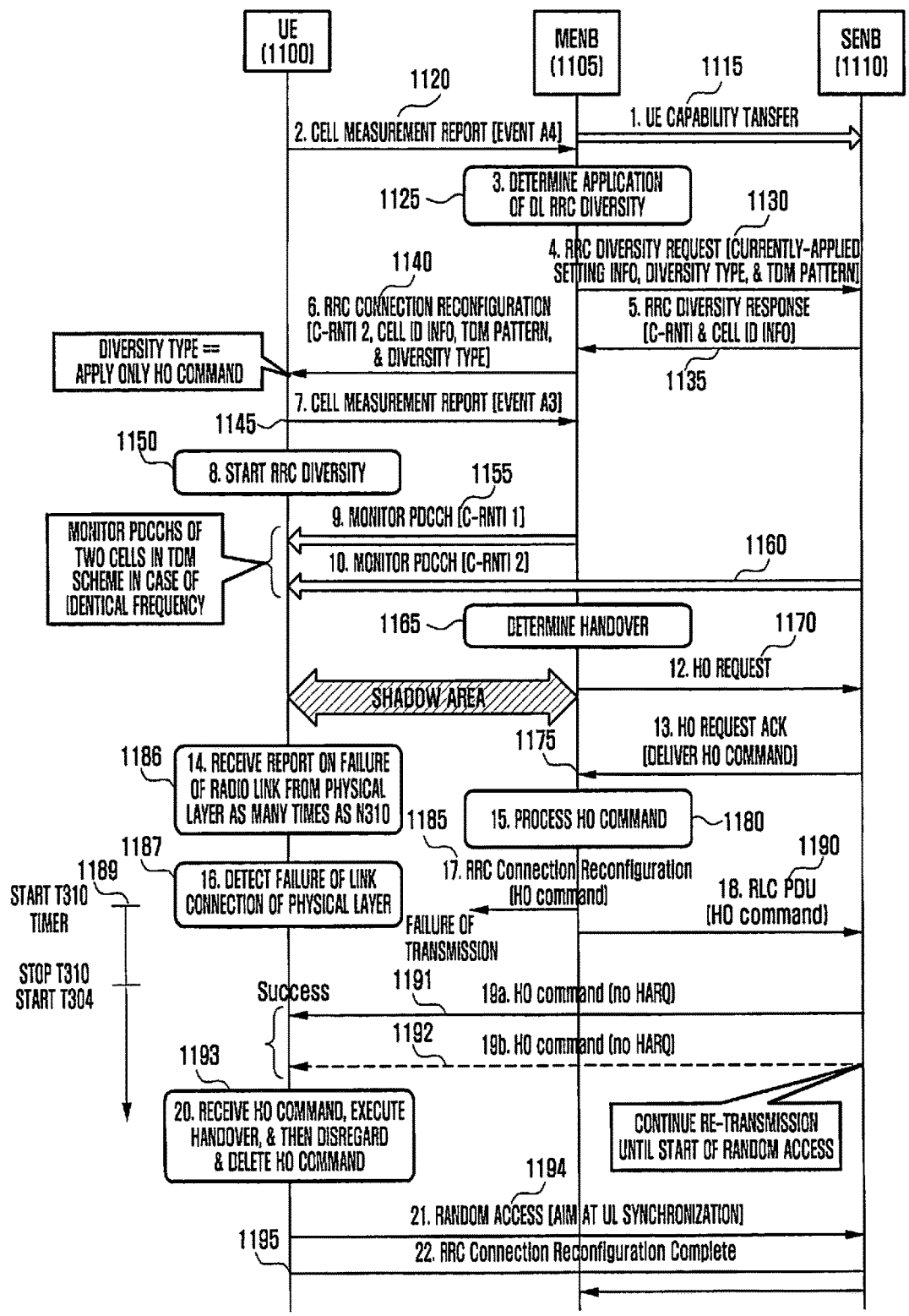
FIG. 11 is a view for explaining a process for performing downlink (DL) RRC diversity in an embodiment of the present disclosure.

FIG. 11 is a view for explaining a process for performing DL RRC diversity in an embodiment of the present disclosure.

Referring to FIG. 11, when a UE 1100 is connected to an MeNB 1105, in step 1115, the MeNB 1105 transmits capability information of the UE 1100 to the neighboring SeNB 1110.

Alternatively, when the UE 1100 reports an Event A4 to the MeNB through a measurement report with respect to the one neighboring SeNB 1115 in step 1120, at this time, the MeNB 1105 may notify the SeNB 1110 of the capability of the UE 1100. The Event A4 may include an event that the UE 1100 reports when the strength of a signal, that the UE 1100 receives from a neighboring cell, is greater than a particular threshold value.

When the information reported by the UE 1100 in step 1120 includes the neighboring SeNB 1110 providing a received signal strength better than the particular threshold value, in step 1125, the MeNB 1105 may determine whether the MeNB 1105 together with the SeNB 1110 is to perform DL RRC diversity. The determination may follow preset information, or may be made based on the information reported by the UE 1100. Also, in an embodiment of the present disclosure, a base station, which has a received signal strength which is measured by the UE 1100 and has a value greater than a threshold value, may be a base station other than the SeNB 1110. At this time, the MeNB 1105 may utilize neighboring base station information in order to determine an SeNB which is to perform DL RRC diversity. More specifically, the MeNB 1105 may receive, from the UE 1100, neighboring base station information on a neighboring base station capable of transmitting, to the UE 1100, a signal having a strength greater than the threshold value among neighboring base stations of the UE 1100. The base station may determine an SeNB, which is to perform DL RRC diversity, on the basis of the received neighboring base station information. More specifically, the base station may determine an SeNB, which is adjacent to the neighboring base station represented by the received neighboring base station information, as a base station to perform DL RRC diversity.

When the DL RRC diversity is used, in step 1130, the MeNB 1105 delivers, to the SeNB 1110, setting information applied to the UE 1100 and information including one or more of a diversity type and a Time Division Multiplexing (TDM) pattern, which are intended to be applied, through an Xn interface by using an RRC DIVERSITY REQUEST message. The diversity type is information for proposing the type of an RRC message using the DL RRC diversity. For example, when the diversity type indicates "ALL RRC MESSAGE," the MeNB and the SeNB may transmit all RRC messages. Alternatively, when the diversity type indicates "HO command only," the MeNB and the SeNB may simultaneously transmit messages according to only a HO command.

The benefit of the DL RRC diversity may be generated in a limited situation, such as a cell boundary area and the like, and thus the execution of the DL RRC diversity in all situations may increase only the degree of complexity without the benefit. Accordingly, the above-described case may be controlled through the diversity type. Alternatively, both the MeNB 1105 and the SeNB 1110 may be limited to transmit the HO command only during a situation (i.e., a handover process) in which the benefit of the DL RRC diversity can be maximized without diversity type information.

Also, the TDM pattern may be applied when the MeNB 1105 and the SeNB 1110 use an identical frequency. In the above-described situation, signals, that the MeNB 1105 and the SeNB 1110 transmit, may cause interference with each other. Accordingly, when the UE 1100 uses different time periods in order to receive RRC messages from the two base stations, the probability of successful receptions of the RRC messages can be improved. As an example, the MeNB 1105 transmits the message to the UE 1100 during a time period from T1 to T2, and then the SeNB 1110 transmits the identical message to the UE 1100 during a time period from T2 to T3. In order to perform the above-described transmissions between which a time difference exists, the UE, the MeNB 1105, and the SeNB 1110 may previously agree on the use of radio resources thereamong.

In step 1135, the SeNB 1110 may deliver an RRC DIVERSITY RESPONSE message to the MeNB 1105 through the Xn interface. The RRC DIVERSITY RESPONSE message includes information which is required for the UE 1100 to receive a message from the SeNB 1110. The required information may include one or more of a Cell Radio Network Temporary Identifier (C-RNTI) and a cell ID (Physical Cell Identifier (PCI) or E-UTRAN Cell Global Identifier (ECGI)). The C-RNTI is a kind of ID information used when the UE identifies scheduling information thereof over a Physical Downlink Control CHannel (PDCCH).

In step 1140, the MeNB 1105 may transmit an RRCConnectionReconfiguration message the UE 1100. The RRC message is used to set DL RRC diversity for the UE 1100, and includes one or more of a C-RNTI of the SeNB 1110, an RCI/ECGI, a diversity type, and a TDM pattern. In an embodiment of the present disclosure, although the UE 1100 has received the RRCConnectionReconfiguration message, the UE 1100 or the base station may not immediately perform DL RRC diversity. For example, when the Diversity type is "HO command only" and a handover process is imminent, the UE 1100 or the base station may perform the DL RRC diversity. In contrast, when the diversity type indicates "ALL RRC MESSAGE," after the UE 1100 receives the RRCConnectionReconfiguration message, the UE 1100 and the base station may immediately begin to perform the DL RRC diversity. This is because the UE 1100 does not know a time point of the transmission of and the type of an RRC message to be transmitted to the UE. In Embodiment 2, for convenience of description, a case is considered in which the diversity type is "HO command only."

In step 1145, the UE 1100 reports, to the MeNB 1105, an Event A3 measurement report on the SeNB 1110. An Event A3 includes a case in which a signal of a neighboring cell, that the UE 1100 has measured, is larger by a particular offset value or more than a signal of the current serving cell. A handover is triggered with reference to the Event A3.

Accordingly, since the UE 1100, which has reported the Event A3, may expect that the handover is soon to be performed, in step 1150, the UE 1100 begins to perform the DL RRC diversity.

In steps 1155 and 1160, the UE 1100 decodes PDCCHs from both the MeNB 1105 and the SeNB 1110, and determines whether an RRC message thereof is transmitted. When an identical frequency is used, the UE 1100 may decode the PDCCHs according to the given TDM pattern. When the PDCCHs are decoded, the UE 1100 uses the respective C-RNTIs of the MeNB 1105 and the SeNB 1110.

In step 1165, the MeNB 1105, which has received the Event A3 reported by the UE 1100, determines a handover to the SeNB 1110.

In step 1170, the MeNB 1105 triggers the handover to the SeNB 1110 by using a HO REQUEST message.

In step 1175, the SeNB 1110 transmits a HO REQUEST ACKnowledgement (ACK) message which is a response message, to the MeNB 1105. The HO REQUEST ACK message includes a HO command message. The handover to the SeNB 1110 may be performed similarly to an existing handover process. At this time, as occasion demands, the UE 1100 may not receive a good signal strength provided by the MeNB 1105. When the UE 1100 rapidly moves from a serving cell to a target cell, this situation may frequently occur.

In an embodiment of the present disclosure, when the UE 1100 performs a handover to a third base station and the MeNB 1105 together with the SeNB (1110) performs the DL RRC diversity, the MeNB 1105 may transmit a HO REQUEST message to the third base station. Also, the MeNB 1105 may receive a HO REQUEST ACK message from the third base station. The MeNB 1105 may deliver handover-related information to the SeNB 1110, and the SeNB 1110 may perform the DL RRC diversity on the basis of the received handover-related information.

In this case, in step 1186, the UE 1100 receives the signal "out-of-sync," which represents that a service cannot be provided by the MeNB 1105, from a physical layer. When the UE 1100 receives the signal "out-of-sync" as many times as N310, the UE 1100 declares Radio Link Failure (RLF) with the MeNB 1105. The declaration of RLF implies that, in step 1185, the UE 1100 has not received the HO command transmitted by the MeNB 1105 in order to indicate a handover.

When the DL RRC diversity is used, the MeNB 1105 may process the HO command in step 1180, and may then deliver the processed information to the SeNB 1110 in step 1190.

Alternatively, without performing step 1190, the SeNB 1110 may directly deliver the generated HO command to the UE 1100 in step 1175.

In step 1191, the SeNB 1110 transmits the HO command to the UE 1100. Since the UE 1100 is in a state where the UE 1100 does not yet perform random access to the SeNB 1110, the UE 1100 is not capable of transmitting Hybrid Automatic Repeat reQuest (HARQ) feedback in UL, and the HO command from the SeNB 1110 may not use HARQ.

Accordingly, the SeNB 1110 may not identify whether the HO command has been successfully received by the UE. An embodiment of the present disclosure proposes a method in which the SeNB 1110 starts one timer when the SeNB 1110 first transmits a HO command, and the SeNB 1110 periodically retransmits the HO command until the timer expires or the SeNB 1110 receives a random access preamble from the UE 1100. The method can improve the rate of successful reception of the HO command without a HARQ operation. Also, in an embodiment of the present disclosure, in a case where the UE 1110 performs the handover to the third base station and the SeNB 1110 performs the DL RRC diversity, the SeNB 1110 may transmit the HO command to the UE

1100 when the SeNB 1110 receives a message representing the completion of the handover, or until a particular timer expires.

In step 1193, when the UE 1100 receives at least one HO command from the MeNB 1105 or the SeNB 1110, the UE 1100 performs a handover operation to the SeNB 1110. Also, the UE 1100 may delete all subsequently-received HO commands according to an embodiment of the present disclosure.

In step 1194, the UE 1100 attempts random access to the SeNB 1110, and transmits an RRCConnectionReconfigurationComplete message to the base station in step 1195.

Also, in an embodiment of the present disclosure, when the SeNB 1110 is added to the UE 1100, RRC diversity may be performed. More specifically, before step 1115, a connection may be established between the UE 1100 and the SeNB 1110. In an embodiment of the present disclosure, examples of a case where the UE 1100 is connected to the SeNB 1110 and DL RRC diversity is performed may include a case where DL RRC diversity is always performed if the SeNB 1110 is added, and a case where DL RRC diversity is performed only for a particular message (e.g., a case of a HO command) after the SeNB 1110 is added. When the DL RRC diversity is performed in a state of adding the SeNB 1110 as described above, HARQ may be applied to the message transmitted in steps 1191 and 1192. Accordingly, the SeNB 1110 may determine whether the message is retransmitted to the UE 1100, on the basis of a HARQ result according to the transmission of the massage to the UE 1100.

In an embodiment of the present disclosure, when the DL RRC diversity is always performed if the SeNB 1110 is added, step 1115 may be omitted, or relevant information may be transmitted/received through the exchange of messages, in the step of adding the SeNB 1110. Also, steps 1125, 1130, 1135, and 1140 may be omitted.

Also, in an embodiment of the present disclosure, after the SeNB 1110 is added, when the DL RRC diversity is performed only for a particular message (e.g., a case of a HO Command), step 1115 may be omitted, or relevant information may be transmitted/received through the exchange of messages, in the step of adding the SeNB 1110. Also, steps 1130, 1135, and 1140 may be omitted, or the parameters may be transmitted in a state of omitting some of the parameters, in steps 1130, 1135, and 1140.

Figure 12:
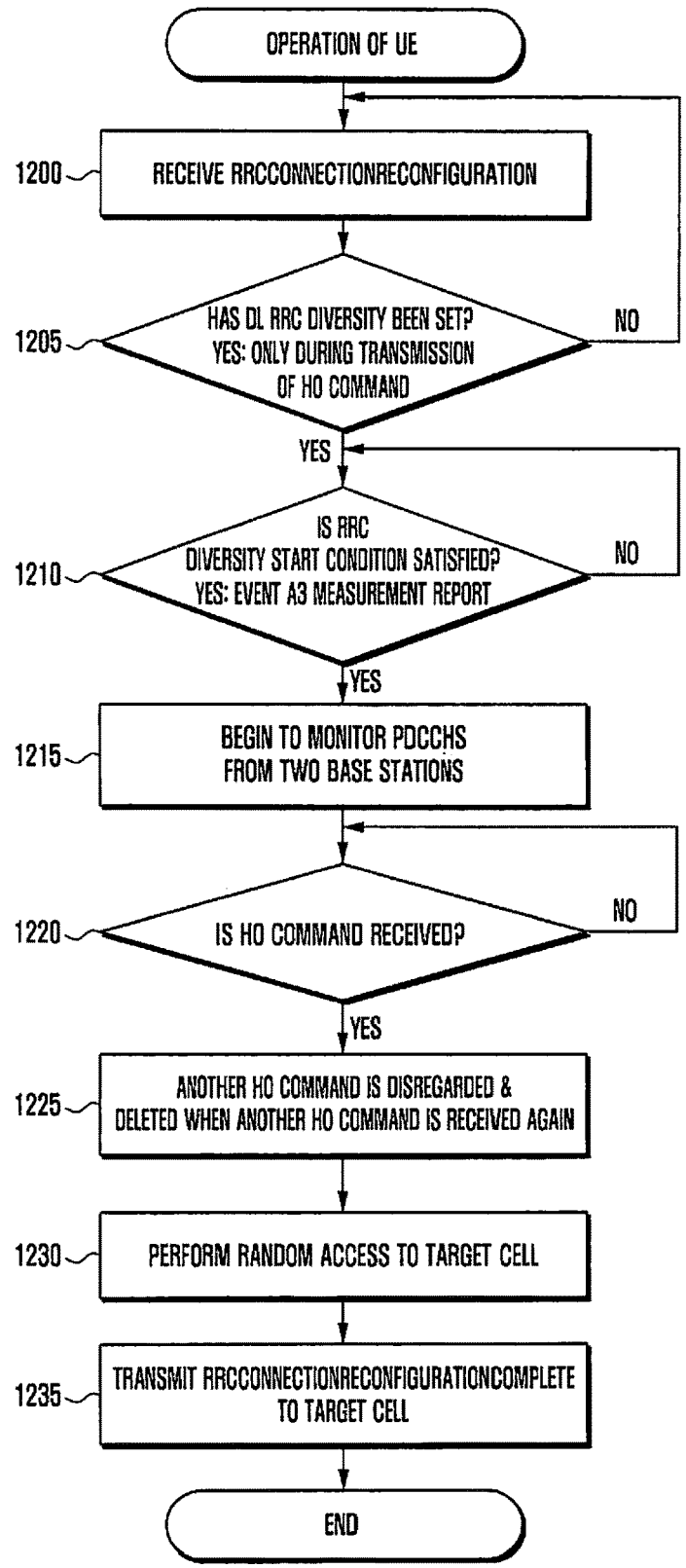
FIG. 12 is a view for explaining an operation of a user equipment in a process for performing DL RRC diversity.

FIG. 12 is a view for explaining an operation of a UE in a process for performing DL RRC diversity.

Referring to FIG. 12, in step 1200, the UE receives an RRCConnectionReconfiguration message.

In step 1205, the UE determines whether the message includes information which sets DL RRC diversity.

When the DL RRC diversity is set, in step 1210, the UE may determine whether a condition for triggering the DL RRC diversity is satisfied. The UE may determine whether the trigger condition is satisfied, on the basis of a diversity type.

When the condition is satisfied, in step 1215, the UE begins to monitor PDCCHs of an MeNB and an SeNB.

In step 1220, the UE determines whether a HO command has been received, on the basis of a result of the monitoring.

When the at least one HO command has been successfully received, in step 1225, the UE may delete subsequently-received HO commands. According to an embodiment of the present disclosure, an operation of step 1225 may be selectively performed.

In step 1230, the UE may perform a handover on the basis of the received HO command, and may attempt random access to the SeNB.

In step 1235, the UE may transmit an RRCConnectionReconfigurationComplete message to the SeNB, and may complete the handover process.

Figure 13:
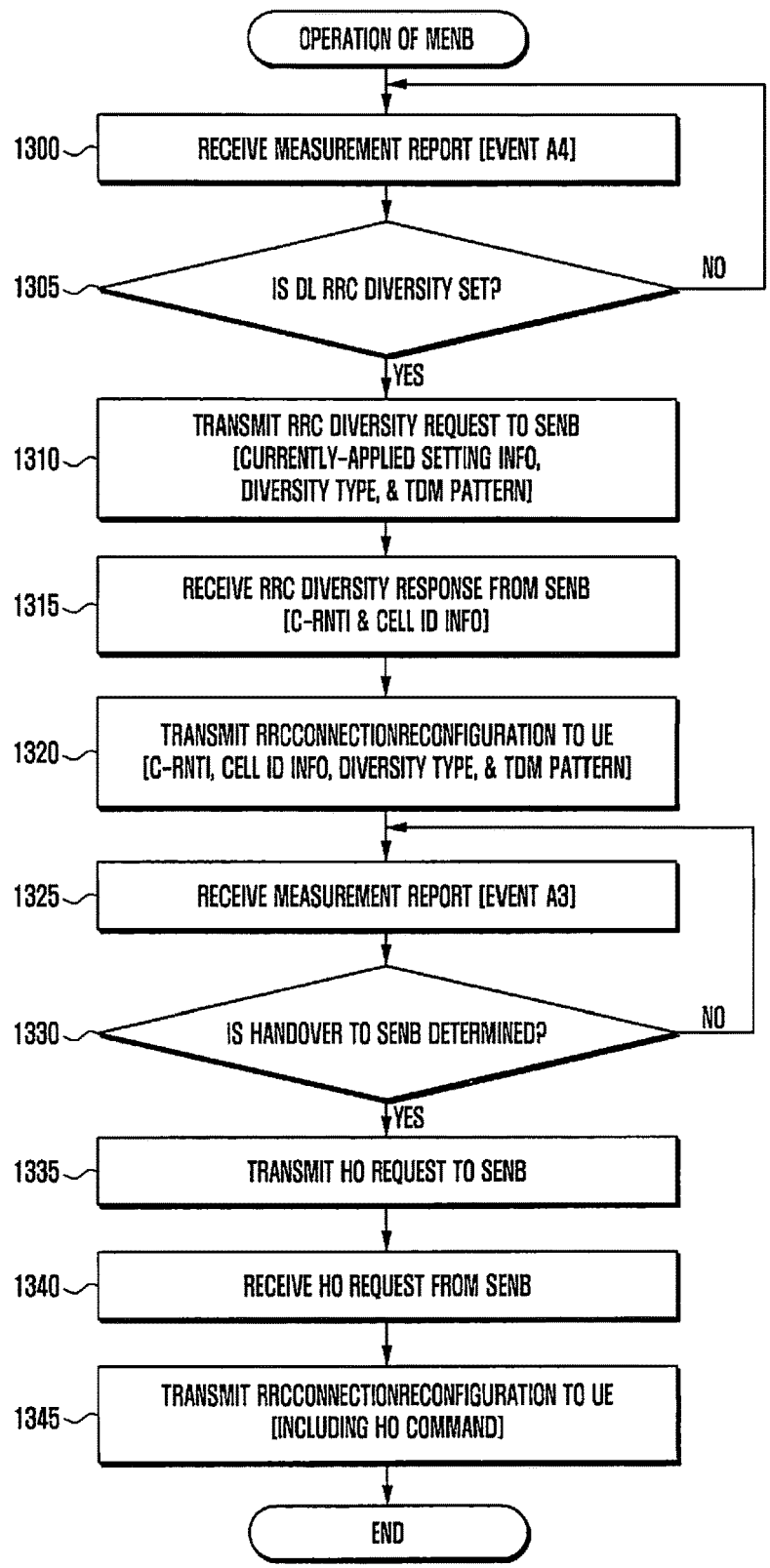
FIG. 13 is a view for explaining an operation of a Master Evolved Node B (MeNB) in a process for performing DL RRC diversity.

FIG. 13 is a view for explaining an operation of an MeNB in a process for performing DL RRC diversity.

Referring to FIG. 13, in step 1300, the MeNB may receive, from the UE, a measurement report triggered by an Event A4 related to one neighboring SeNB.

In step 1305, the MeNB may determine whether the MeNB together with the SeNB is to use DL RRC diversity, on the basis of the received measurement report information.

When the DL RRC diversity is used, in step 1310, the MeNB may instruct the SeNB to set DL RRC diversity by using an RRC DIVERSITY REQUEST message. At this time, the MeNB may include one or more pieces of information among the pieces of information, which are described in step 1130 illustrated in FIG. 11, in the RRC DIVERSITY REQUEST message, and may transmit the RRC DIVERSITY REQUEST message including the one or more pieces of information.

In step 1315, the MeNB receives an RRC DIVERSITY RESPONSE message from the SeNB. The message includes one or more pieces of information among cell ID information (PCI or ECGI) of the SeNB and a C-RNTI that the UE is to use to decode a PDCCH from the SeNB.

In step 1320, the MeNB sets DL RRC diversity for the UE by using an RRCConnectionReconfiguration message. Also, the message includes information required to perform the DL RRC diversity. More specifically, the message may include one or more pieces of information among the pieces of information transmitted in step 1140 of FIG. 11.

In step 1325, the MeNB may receive, from the UE, a measurement report triggered by an Event A3 related to the SeNB.

In step 1330, the MeNB determines whether the MeNB performs a handover to the SeNB.

When it is determined that the MeNB performs the handover, in step 1335, the MeNB transmits a HO REQUEST message to the SeNB.

In step 1340, the MeNB receives a HO REQUEST ACK message, which includes a HO command, from the SeNB.

In step 1345, the MeNB includes the HO command in an RRCConnectionReconfiguration message, and transmits the RRCConnectionReconfiguration message including the HO command to the SeNB.

Figure 14:
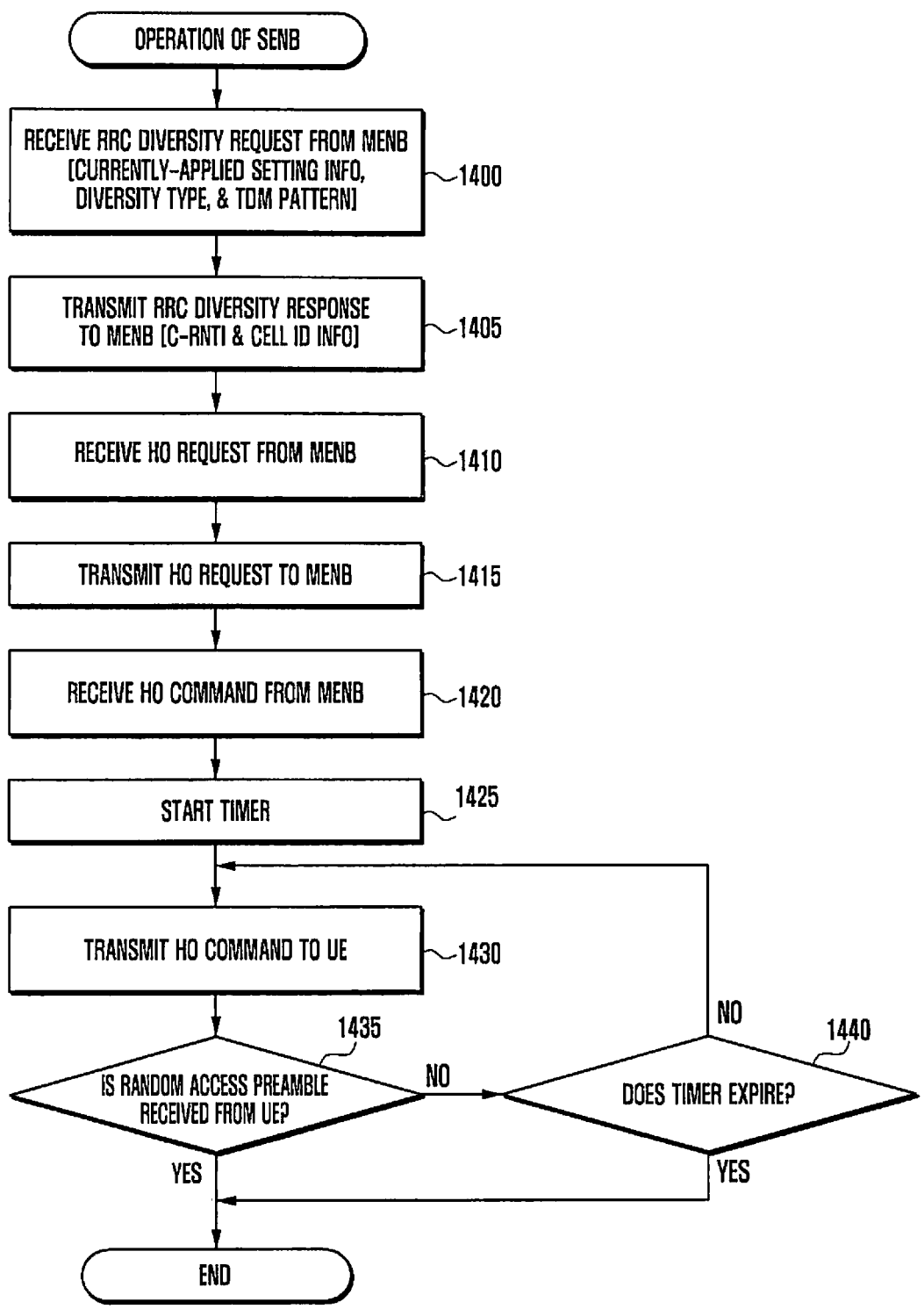
FIG. 14 is a view for explaining an operation of a Secondary Evolved Node B (SeNB) in a process for performing DL RRC diversity.

FIG. 14 is a view for explaining an operation of an SeNB in a process for performing DL RRC diversity.

Referring to FIG. 14, in step 1400, the SeNB may receive an RRC DIVERSITY REQUEST message, which instructs the SeNB to set DL RRC diversity, from the MeNB.

In step 1405, the SeNB transmits an RRC DIVERSITY RESPONSE message to the MeNB. The message includes one or more pieces of information among cell ID information (PCI or ECGI) of the SeNB and a C-RNTI that the UE is to use to decode a PDCCH from the SeNB.

In step 1410, the SeNB may receive a HO REQUEST message from the MeNB.

In step 1415, the SeNB transmits a HO REQUEST ACK message, which includes a HO command, to the MeNB.

In step 1420, the SeNB receives a HO command from the MeNB.

In step 1425, the SeNB triggers one timer, and transmits HO command to the UE in step 1420.

In steps 1435 and 1440, the SeNB may successfully receive a random access preamble from the UE, or may periodically transmit a HO command to the UE until the timer expires.

Figure 15:
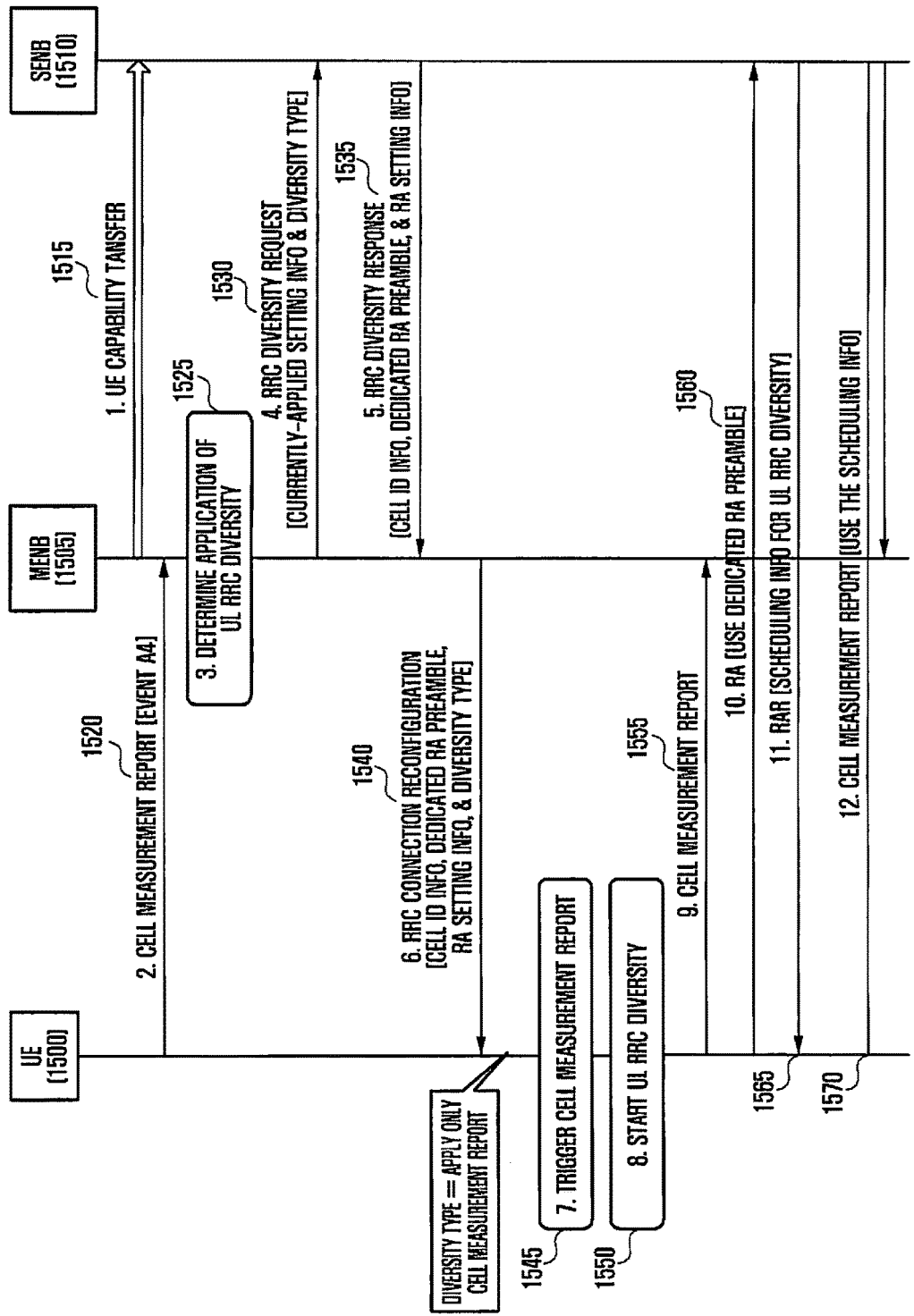
FIG. 15 is a view for explaining a process for performing uplink (UL) RRC diversity in an embodiment of the present disclosure.

FIG. 15 is a view for explaining a process for performing UL RRC diversity in an embodiment of the present disclosure.

Referring to FIG. 15, when a UE 1500 is connected to an MeNB 1505, in step 1515, the MeNB 1505 transmits capability information of the UE 1500 to a neighboring SeNB 1510.

Alternatively, when the UE 1500 reports an Event A4 to the MeNB 1505 through a measurement report with respect to the one neighboring SeNB 1510 in step 1520, at this time, the MeNB 1505 may notify the SeNB 1510 of the capability of the UE 1500.

When it is determined, based on the information received in step 1520, that the neighboring SeNB 1510 exists which provides a better received signal strength than a particular threshold value, in step 1525, the MeNB 1505 determines whether the MeNB 1505 together with the SeNB 1510 is to perform UL RRC diversity.

When the UL RRC diversity is used, in step 1530, the MeNB 1505 delivers setting information applied to the UE 1500 and information including one or more of a diversity type and a TDM pattern, which are intended to be applied, to the SeNB 1510 through an Xn interface by using an RRC DIVERSITY REQUEST message. According to an embodiment of the present disclosure, a diversity type in UL may be used to indicate a particular UL RRC message, namely, a measurement report, a scheduling request, or the like.

In step 1535, the SeNB 1510 delivers an RRC DIVERSITY RESPONSE message to the MeNB 1505 through the Xn interface. The RRC DIVERSITY RESPONSE message includes information required for the UE 1500 to receive a message from the SeNB 1510. Specifically, the information may include one or more of a C-RNTI, a cell ID (PCI or ECGI), a random access preamble, and a Random Access CHannel (RACH) configuration. An embodiment of the present disclosure proposes a method in which the UE 1500 utilizes a RACH process to transmit an RRC message to the SeNB 1510.

Accordingly, to this end, the SeNB 1510 needs to previously deliver, to the UE 1500, RACH-related information, namely, a dedicated Random Access (RA) preamble to be used by the UE 1500 and a RACH configuration.

In step 1540, the MeNB 1505 may transmit an RRCConnectionReconfiguration message to the UE 1500. The RRC message is used to set UL RRC diversity for the UE 1500, and also includes one or more of a C-RNTI of the SeNB 1510, an RCI/ECGI, a diversity type, a TDM pattern, an RA preamble, and a RACH configuration.

Although the UE 1500 has received the RRCConnectionReconfiguration message, the UE 1500 and the base station may not immediately perform UL RRC diversity. For example, when the diversity type is "Measurement Report (MR) only" and one measurement report is triggered, the UE 1500 and the base station may begin to perform the UL RRC diversity. In the description of Embodiment 2, a case is considered in which the diversity type is "MR only."

In step 1545, the UE 1500 triggers one measurement report.

In step 1550, the UE 1500 begins to perform the UL RRC diversity.

In step 1155, the UE 1500 may transmit a measurement report to the MeNB 1505.

Then, in step 1160, the UE 1500 attempts RA to the SeNB 1510. In an embodiment of the present disclosure, in order to transmit the measurement report to the SeNB 1510, first, RA needs to be performed for UL synchronization. At this time, use may be made of a dedicated RA preamble provided by the SeNB 1510.

In step 1565, the SeNB 1510 transmits a Random Access Response (RAR) message to the UE 1500, and the RAR message includes UL scheduling information (UL grant) required to transmit the measurement report.

In step 1570, the UE 1500 transmits the measurement report to the base station by using the UL grant information.

Figure 16:
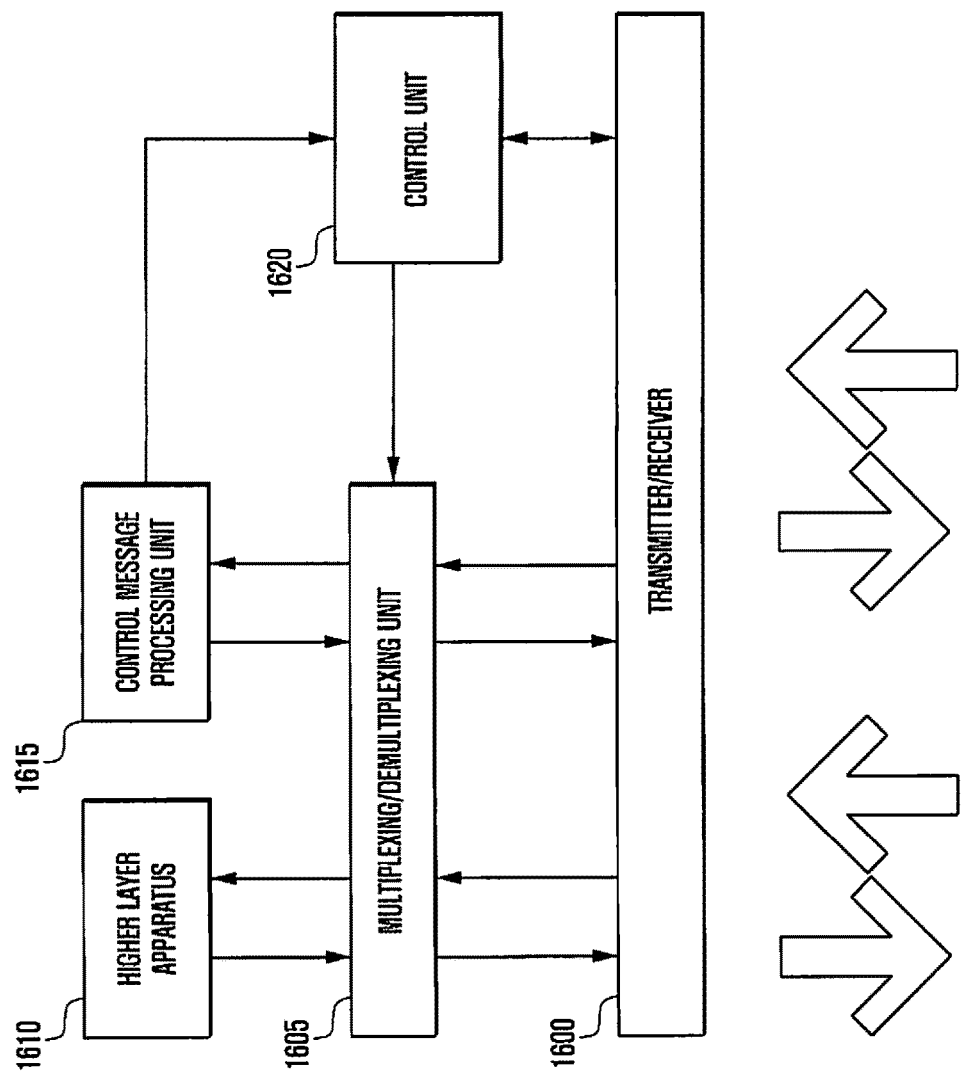
FIG. 16 is a block diagram illustrating an internal configuration of a user equipment to which the present disclosure is applied.

FIG. 16 is a block diagram illustrating an internal configuration of a UE to which the present disclosure is applied.

Referring to FIG. 16, the UE transmits and receives data and the like to/from a higher layer 1610, and transmits and receives control messages through a control message processing unit 1615. Also, when the UE transmits a control signal or data to a base station, according to the control of the control unit 1620, the UE multiplexes the control signal or data through a multiplexing unit 1605, and then transmits the multiplexed control signal or data through a transmitter 1600. In contrast, when the UE receives a physical signal, according to the control of the control unit 1620, the UE receives the physical signal through a receiver 1600, demultiplexes the received signal through a demultiplexing unit 1605, and delivers the demultiplexed signal to the higher layer 1610 or the control message processing unit 1615 according to message information.

Figure 17:
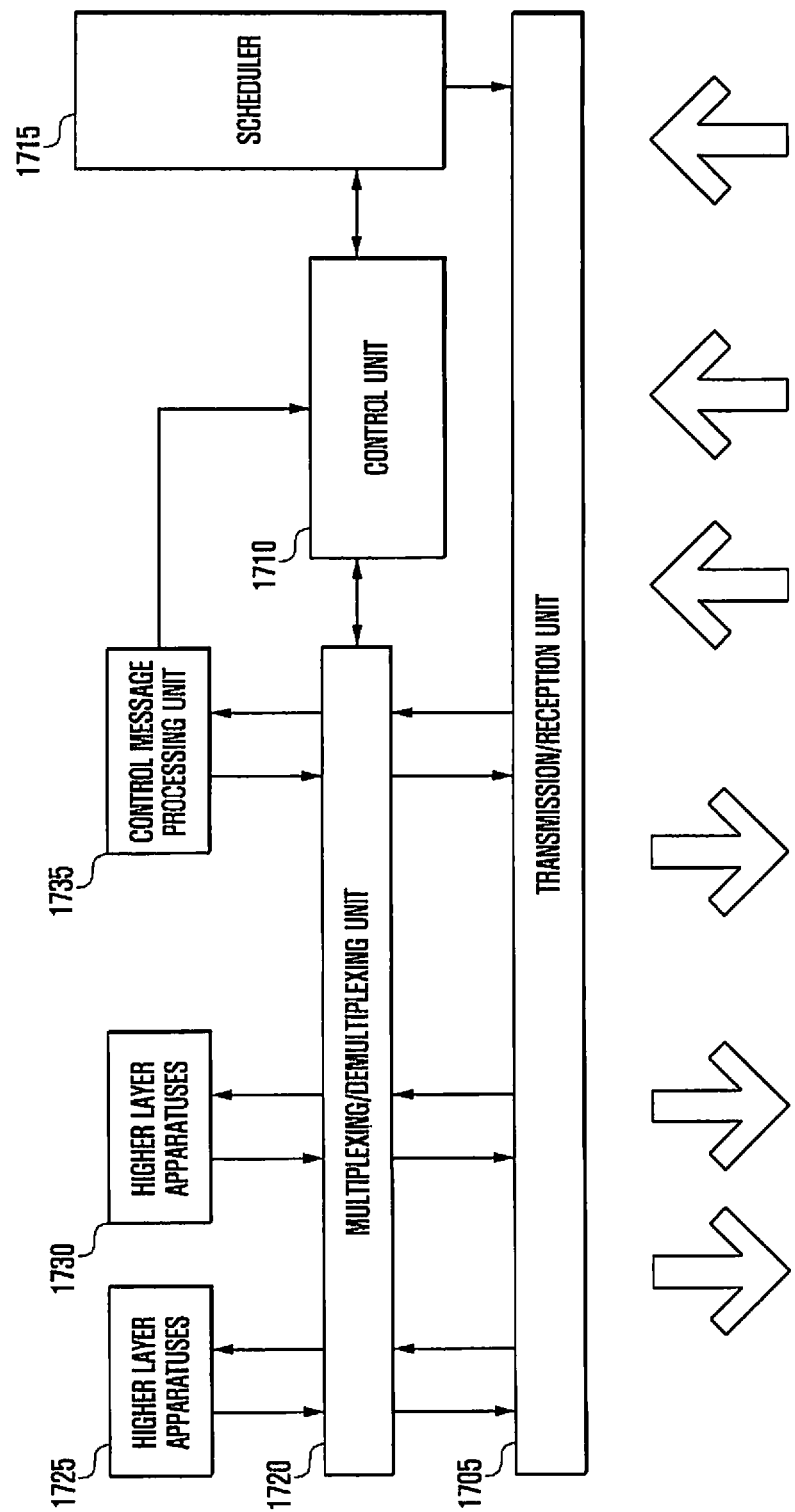
FIG. 17 is a block diagram illustrating a configuration of a base station according to the present disclosure.

FIG. 17 is a block diagram illustrating a configuration of a base station according to the present disclosure.

Referring to FIG. 17, the base station device includes a transmission/reception unit 1705, a control unit 1710, a multiplexing/demultiplexing unit 1720, a control message processing unit 1735, various higher layer processing units 1725 and 1730, and a scheduler 1715. The transmission/reception unit 1705 transmits data and a predetermined control signal through a DL carrier and receives data and a predetermined control signal through a UL carrier. When multiple carriers are configured, the transmission/reception unit 1705 transmits and receives data and control signals through the multiple carriers. The multiplexing/demultiplexing unit 1720 serves to multiplex data generated by the higher layer processing units 1725 and 1730 or the control message processing unit 1735, or serves to demultiplex data provided by the transmission/reception unit 1705 and to deliver the demultiplexed data to the appropriate higher layer processing units 1725 and 1730, the control message processing unit 1735, or the control unit 1710.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method of a terminal in a communication system, the method comprising:
  receiving information for an extended discontinuous reception (DRX) cycle for the terminal;
  identifying whether a length of an extended DRX cycle configured for the terminal is longer than a modification period, based on the information for the extended DRX cycle;
  receiving, from a base station, system information;

verifying whether system information stored in the terminal is valid based on the received system information from the base station, based on that the length of the extended DRX cycle configured for the terminal is longer than the modification period; and monitoring a plurality of paging messages during a time period configured for the terminal, based on that the length of the extended DRX cycle configured for the terminal is longer than the modification period.

2. A method of a base station in a communication system, the method comprising:

transmitting, to a terminal, information for an extended discontinuous reception (DRX) cycle for the terminal;
transmitting, to the terminal, system information; and
transmitting, to the terminal, a plurality of paging messages,
wherein, whether a length of an extended DRX cycle configured for the terminal is longer than a modification period is identified, by the terminal, based on the information for the extended DRX cycle, a validation of system information stored in the terminal is verified based on the system information transmitted to the terminal, based on that the length of the extended DRX cycle is longer than the modification period, a plurality of paging messages are monitored during a time period configured for the terminal, based on that the length of the extended DRX cycle configured for the terminal is longer than the modification period.

3. A terminal in a communication system, the terminal comprising:

a transceiver; and
a controller coupled with the transceiver and configured to:
receive information for an extended discontinuous reception (DRX) cycle for the terminal,
identify whether a length of an extended DRX cycle configured for the terminal is longer than a modification period, based on the information for the extended DRX,
control the transceiver to receive, from a base station, system information,
verify whether system information stored in the terminal is valid based on the received system information from the base station, based on that the length of the extended DRX cycle configured for the terminal is longer than the modification period, and
monitor a plurality of paging messages, during a time period configured for the terminal, in case that the length of the extended DRX cycle configured for the terminal is longer than the modification period.

4. A base station in a communication system, the base station comprising:

a transceiver; and
a controller coupled to the transceiver and configured to:
control the transceiver to transmit to a terminal, information for an extended discontinuous reception (DRX) cycle for the terminal,
control the transceiver to transmit system information, and
transmit, to the terminal, a plurality of paging messages,
wherein, whether a length of an extended DRX cycle configured for the terminal is longer than a modification period is identified, by the terminal, based on the information for the extended DRX cycle, a validation of system information stored in the terminal is verified based on the system information transmitted to the terminal, based on that the length of the extended DRX cycle is longer than the modification period, a plurality of paging messages are monitored during a time period configured for the terminal, in case that the length of the extended DRX cycle configured for the terminal is longer than the modification period.

* * * * *